US012015602B2

United States Patent
Chandran

(10) Patent No.: US 12,015,602 B2
(45) Date of Patent: Jun. 18, 2024

(54) INFORMATION SECURITY SYSTEM AND METHOD FOR SECURE DATA TRANSMISSION AMONG USER PROFILES USING A BLOCKCHAIN NETWORK

(71) Applicant: Bank of America Corporation, Charlotte, NC (US)

(72) Inventor: Sidhartha Chandran, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 393 days.

(21) Appl. No.: 17/403,165

(22) Filed: Aug. 16, 2021

(65) Prior Publication Data

US 2023/0046579 A1 Feb. 16, 2023

(51) Int. Cl.
*H04L 9/40* (2022.01)
*G06F 9/455* (2018.01)
*G06F 16/22* (2019.01)

(52) U.S. Cl.
CPC ........ *H04L 63/083* (2013.01); *G06F 9/45558* (2013.01); *G06F 16/22* (2019.01)

(58) Field of Classification Search
CPC ..... H04L 63/083; G06F 16/22; G06F 9/45558
See application file for complete search history.

(56) References Cited

U.S. PATENT DOCUMENTS

| | | | |
|---|---|---|---|
| 10,135,609 B2 | 11/2018 | Bibera et al. | |
| 10,230,530 B2 | 3/2019 | Lancashire et al. | |
| 10,291,627 B2 | 5/2019 | Gleichauf | |
| 10,469,248 B2 | 11/2019 | Chalakudi et al. | |
| 10,476,701 B2 | 11/2019 | Wang et al. | |
| 10,521,505 B2 | 12/2019 | Anderson et al. | |
| 10,542,046 B2 | 1/2020 | Katragadda et al. | |
| 10,567,320 B2 | 2/2020 | Chalakudi et al. | |
| 10,581,869 B2 | 3/2020 | Simons | |
| 10,594,495 B2 | 3/2020 | High et al. | |
| 10,621,510 B2 | 4/2020 | Saxena et al. | |
| 10,642,967 B2 | 5/2020 | Balaraman et al. | |

(Continued)

OTHER PUBLICATIONS

DTCC; "Will Blockchain Revolutionize Clearance and Settlement" published on Mar. 10, 2021, Retrieved from the Internet <URL:https://perspectives.dtcc.com/gallery/will-blockchain-revolutionize-clearanceand-settlement. [online] [retrieved on Feb. 19, 2024].

(Continued)

*Primary Examiner* — Hee K Song

(57) ABSTRACT

A system for transmitting data objects among user profiles receives a request to transmit a particular number of a first type of data object to a receiver profile. The system determines whether a sender profile is associated with the particular number of the first type of data object. In response to determining that the sender profile is not associated with the particular number of the first type of data object, the system identifies one or more other types of data objects that correspond to the particular number of the first type of data object. The system initiates a user interaction session. The system generates a block within a blockchain network to store user interaction session metadata. The system transmits the identified one or more other types of data objects to the receiver profile. The system stores, in the block, a completion token that indicates the user interaction session is completed.

20 Claims, 2 Drawing Sheets

(56) References Cited

U.S. PATENT DOCUMENTS

| | | |
|---|---|---|
| 10,686,799 B2 | 6/2020 | Kelly |
| 10,715,317 B2 | 7/2020 | Chari et al. |
| 10,762,479 B2 * | 9/2020 | Hyun .................. G06Q 20/0658 |
| 10,785,232 B2 | 9/2020 | Qiu et al. |
| 10,833,861 B2 | 11/2020 | Chari et al. |
| 10,846,416 B2 | 11/2020 | Uhr et al. |
| 10,848,314 B2 | 11/2020 | Wang et al. |
| 10,887,559 B2 | 1/2021 | Veneziano |
| 10,938,565 B2 | 3/2021 | Qiu |
| 10,938,567 B2 | 3/2021 | Martino et al. |
| 10,970,690 B2 | 4/2021 | Klarman et al. |
| 10,977,645 B2 * | 4/2021 | Paschini ............. H04L 63/0435 |
| 11,023,309 B2 | 6/2021 | Deng |
| 2009/0234878 A1 | 9/2009 | Herz et al. |
| 2017/0046652 A1 | 2/2017 | Haldenby et al. |
| 2017/0132625 A1 | 5/2017 | Kennedy |
| 2017/0132626 A1 | 5/2017 | Kennedy |
| 2017/0148016 A1 | 5/2017 | Davis |
| 2017/0154331 A1 | 6/2017 | Voorhees |
| 2017/0236121 A1 | 8/2017 | Lyons et al. |
| 2017/0285720 A1 | 10/2017 | Shah |
| 2017/0357966 A1 * | 12/2017 | Chandrasekhar ...... G06Q 20/06 |
| 2018/0165588 A1 | 6/2018 | Saxena et al. |
| 2018/0165598 A1 | 6/2018 | Saxena et al. |
| 2018/0167200 A1 | 6/2018 | High et al. |
| 2018/0197173 A1 | 7/2018 | Durvasula et al. |
| 2018/0276600 A1 | 9/2018 | Fuller et al. |
| 2018/0374094 A1 | 12/2018 | Kohli |
| 2019/0005469 A1 | 1/2019 | Dhupkar et al. |
| 2019/0012695 A1 * | 1/2019 | Bishnoi ................ G06Q 20/223 |
| 2019/0027237 A1 | 1/2019 | Mcfarlane |
| 2019/0066228 A1 | 2/2019 | Wright |
| 2019/0116024 A1 | 4/2019 | Wright et al. |
| 2019/0266601 A1 | 8/2019 | Allen |
| 2019/0324958 A1 * | 10/2019 | Ow ....................... H04L 9/3247 |
| 2020/0177388 A1 | 6/2020 | Qiu |
| 2020/0250683 A1 | 8/2020 | Padmanabhan et al. |
| 2020/0252406 A1 | 8/2020 | Padmanabhan et al. |
| 2021/0125158 A1 | 4/2021 | Kyung |
| 2021/0319436 A1 * | 10/2021 | Ow .................... G06Q 20/0658 |
| 2022/0235621 A1 * | 7/2022 | Sherman ............. E21B 33/1208 |

OTHER PUBLICATIONS

Forbes, Retrieved from the internet: <URL:https://www.forbes.com/sites/philippsandner/2020/12/02/will-blockchain-replace-clearinghouses-a-case-of-dvp-post-trade-settlement/?sh=1edebe45408f. [online] [retrieved on Feb. 21, 2024].

Xu, Haohan; "Blockchain technology will remove barriers to instant international settlement" published on Jul. 16, 2020, Retrieved from the Internet <URL:https://www.bankingdive.com/news/blockchain-technology-instantinternational-settlements/581726/. [online] [retrieved on Feb. 21, 2024].

* cited by examiner

US 12,015,602 B2

INFORMATION SECURITY SYSTEM AND METHOD FOR SECURE DATA TRANSMISSION AMONG USER PROFILES USING A BLOCKCHAIN NETWORK

TECHNICAL FIELD

The present disclosure relates generally to information security, and more specifically to an information security system and method for secure data transmission among user profiles using a blockchain network.

BACKGROUND

As the Internet continues to be utilized by an ever-increasing number of users, so does data transmission among users via the Internet. In some cases, data that is desired to be sent to a receiver profile associated with a receiver may not be associated with or available in a sender profile associated with a sender. In such cases, the sender may initiate multiple retrieval request messages to a database server, where the sender profile is stored, to retrieve the requested data. In response, the database server may issue multiple negative acknowledgment messages that indicate the sender profile is not associated with the requested data. In such cases, using the current data transmission technology, the network communication bandwidth may be occupied by the multiple retrieval request messages and multiple negative acknowledgment messages. In addition, data transmissions are vulnerable to unauthorized access in multiple ways, such as cyber-attacks. Current technology is not configured to provide a reliable and efficient solution for secure data transmission among user profiles.

SUMMARY

The system described in the present disclosure is particularly integrated into a practical application of securing the transmission of data objects among user profiles. The system described in the present disclosure may further be integrated into a practical application of improving network communications among computer systems from which the user profiles are accessed, as described below.

In an example scenario, assume that a first user wants to send a particular number of a first type of data object to a second user. In some examples, the first type of data object may be a document, text, media item, etc. The first user accesses their user profile to initiate a request to send the particular number of the first type of data objects to the second user. In some cases, the particular number of the first type of data objects may not be available in the user profile of the first user. In other words, the first user profile may not be associated with the particular number of the first type of data object. In such cases, the disclosed system determines whether the first user profile is associated with one or more other types of data objects that correspond to the particular number of the first type of data object. In response to determining that the first user profile is associated with the one or more other types of data objects that correspond to the particular number of the first type of data objects (or are associated with two or more other types of data objects that in the aggregate correspond to the particular number of data objects), the disclosed system retrieves those data objects.

In other examples, the data object may include processing resources. The processing resources may include storage capacity in a database, a computer system, etc. Thus, in another example scenario, assume that the first user wants to allocate a particular amount of processing resources to the second user's profile. In some cases, the first user's profile may not be associated with the particular amount of unallocated processing resources. In such cases, the disclosed system determines whether the first user profile is associated with one or more occupied processing resources that correspond to the particular amount of requested unallocated processing resources.

In response, the disclosed system initiates a user interaction session between the first user profile and the second user profile, during which the identified data objects may be transmitted to the second user profile.

The disclosed system generates a block in a blockchain network, where the block is used to store user interaction session metadata. The user interaction session metadata may comprise the first user profile, the second user profile, and the identified data objects.

The disclosed system generates a security token that is used to validate and uniquely identify the user interaction session. The disclosed system may add the security token to the user interaction session metadata. The security token may comprise a hash key.

The disclosed system sends the user interaction session metadata to one or more nodes within the blockchain network. For example, the disclosed system may send the user interaction session metadata to a first node that is associated with the first user profile, and a second node that is associated with the second user profile. In some examples, each node may comprise a computing device.

The disclosed system transmits or reallocates the identified data objects from the first user profile to the second user profile. In this process, the disclosed system may transmit or reallocate the identified data objects via one or more nodes within the blockchain network.

In one embodiment, a system for transmitting data objects among user profiles using blockchain comprises a blockchain network and a processor. The blockchain network comprises a sender node and a receiver node, where the sender node is associated with a sender profile, and the receiver node is associated with a receiver profile. The processor is communicatively coupled with the blockchain network. The processor is configured to receive a request to transmit a particular number of a first type of data object to the receiver profile. The processor evaluates the sender profile to determine whether the sender profile is associated with the particular number of the first type of data object. In response to determining that the sender profile is not associated with the particular number of the first type of data object, the processor determines whether the sender profile is associated with one or more other types of data objects that correspond to the particular number of the first type of data object. The processor initiates a user interaction session between the sender profile and the receiver profile, in response to determining that the sender profile is associated with the one or more other types of data objects that correspond to the particular number of the first type of data object. During the user interaction session, the one or more other types of data objects are transmitted from the sender profile to the receiver profile. The processor generates a block in the blockchain network. The block is used to store user interaction session metadata comprising one or more of the sender profile, the receiver profile, and the requested data object. The block comprises a storage capacity. The processor retrieves the one or more other types of data objects from the sender profile. The processor transmits the one or more other types of data objects from the sender profile to the receiver profile. The processor stores, in the block, an indication that the one or more other types of data objects were transmitted from the sender profile to the receiver profile. The processor stores, in the block, a completion token that indicates the user interaction session has been completed.

The disclosed system provides several practical applications and technical advantages, which include: 1) technology that provides secure data object transmissions among user profiles, for example, by validating a security token that is used to uniquely identify a particular data object transmission in conjunction with distributing metadata that comprises information related to the data object transmission among multiple nodes within the blockchain network; 2) technology that improves processing resource management by reallocating one or more occupied (or allocated) processing resources to the receiving user profile, in cases where there is not enough unallocated processing resources associated with the sending user profile; 3) technology that improves underlying operations of computer systems that requested processing resources are reallocated to; thus the receiving computer systems can use the reallocated processing resources to perform their operations; and 4) technology that improves communication network bandwidth utilization, e.g., by identifying one or more other types of data objects that correspond to the requested type of data object if it is determined that the sending user profile is not associated with the requested type of data object; thus obviating the need for transmitting multiple data object retrieval requests that may lead to receiving multiple negative acknowledgements that indicate the requested data object is not associated with the sending user profile.

As such, the disclosed system may be integrated into a practical application of improving the current data transmission technology by providing secure data object transmissions among user profiles. For example, upon initiation of the data object transmission, the disclosed system generates a unique security token that comprises a hash key for the data object transmission. The disclosed system may store one or more copies of the security token in one or more nodes within the blockchain network. For example, the disclosed system may store copies of the security token in the sending node that is associated with the sending user profile and the receiving node that is associated with the receiving user profile. Once the data object transmission is completed, the disclosed system determines whether the security token is valid by comparing the copies of the security token and to determine whether they match.

The disclosed system may further be integrated into an additional practical application of improving the current processing resource allocation and reallocation, and processing resource management technologies by providing flexibility in processing resource reallocation of occupied processing resources in cases where there are not enough unallocated processing resources associated with the sending user profile. Furthermore, the disclosed system may further be integrated into an additional practical application of improving the security of processing resource allocation.

The disclosed system may further improve the security of the data transmission by distributing metadata that includes information related to the data transmission among multiple nodes within the blockchain network. Thus, multiple copies of the data transmission metadata (or user interaction session metadata) resident in multiple nodes may be used to validate the data transmission. For example, even if a bad actor gains unauthorized access to one of the nodes and changes one or more aspects of the data transmission, such as the destination of the data objects (e.g., processing resources), the copies of the data transmission in the other nodes may be used to invalidate the change made to the data transmission metadata by the bad actor.

The disclosed system may further be integrated into an additional practical application of improving underlying operations of computer systems that store user profiles. For example, by improving the security of the processing resource allocations and data transmissions among user profiles, unauthorized access to the user profiles is reduced (or eliminated), thus, data stored in the computing systems that store user profiles are kept secure from unauthorized access. This, in turn, provides an additional practical application of improving the network security of a network infrastructure that enables processing resource allocations and data transmissions between computing systems.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to implement secure data object transmission among user profiles. This disclosure provides various systems and methods to implement secure data object transmission among user profiles by leveraging the blockchain ecosystem. In one embodiment, a system 100 for implementing secure data object transmission among user profiles using a blockchain network is described in FIG. 1. In one embodiment, method 300 for implementing secure data object transmission among user profiles using a blockchain network is described in FIG. 2.

Figure 1:
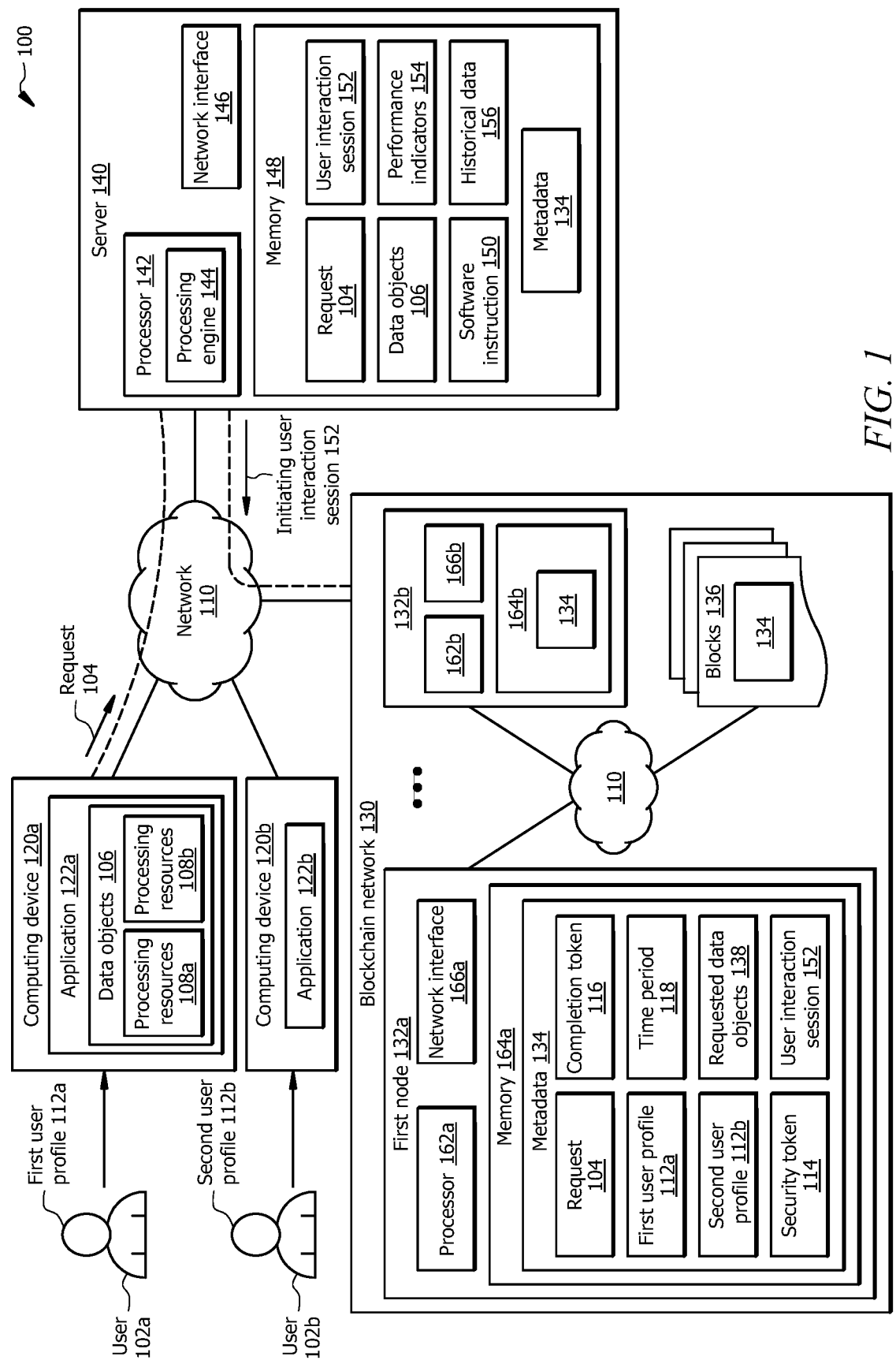
FIG. 1 illustrates an embodiment of a system configured to implement secure data object transmission among user profiles using a blockchain network.

Example System for Implementing Secure Data Object Transmission Among User Profiles Using a Blockchain Network FIG. 1 illustrates one embodiment of a system 100 that is configured to transfer or allocate data objects 106 among user profiles 112 using a blockchain ecosystem or network 130. In one embodiment, system 100 comprises a server 140. In some embodiments, system 100 further comprises a network 110, one or more computing devices 120, and the blockchain network 130. Network 110 enables communication among the components of the system 100. Server 140 comprises a processor 142 in signal communication with a memory 148. Memory 148 stores software instructions 150 that when executed by the processor 142, cause the processor 142 to perform one or more functions described herein. For example, when the software instructions 150 are executed, the processor executes a processing engine 144 to allocate or transmit a requested data object 106 from a first user profile 112a to a second user profile 112b. In other embodiments, system 100 may not have all of the components listed and/or may have other elements instead of, or in addition to, those listed above.

System Components

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Each of the computing devices 120a and 120b is an instance of a computing device 120. Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120. The system 100 may include any number of computing devices 120.

Application 122 may be a software, web, and/or mobile application 122 that is generally configured to allow the users 102 to access their user profiles 112. The user profiles 112 may be stored in one or more databases communicatively coupled with the components of the system 100. For example, a user 102 may access their user profile 112 by providing their login credentials to the application 122. A server associated with the application 122 (e.g., server 140) may be configured to evaluate whether the provided login credentials are valid based on comparing the provided login credentials with login credentials previously set by the user 102 and stored in a memory, e.g., memory 148. Upon validating the login credentials, the user 102 may access their user profile 112 and access data objects 106 stored in their user profiles 112. In some examples, the data objects 106 may include processing resources 108. The processing resources 108 may include temporal resources (e.g., execution cycles of one or more processing nodes, execution time on one or more processing nodes, etc.), physical resources (e.g., a number of processing nodes, an amount of machine-readable storage (e.g., memory and/or secondary storage), etc.), and/or other allocable processing resources 108. For example, the processing resources 108 may be associated with hardware and/or software modules. The user 102 may have a set of processing resources 108 associated with their user profile 112. A first amount of processing resources 108 may be unallocated (or available to be allocated), such as processing resources 108a. A second amount of processing resources 108 may be occupied (or in use or already allocated to perform a function), such as processing resources 108b. For example, A user 102 may want to allocate (or reallocate or share) processing resources 108 to one or more other users 102. In some examples, the data objects 106 may include any other data, such as documents, files, media items, etc.

In an example operation, assume that the first user 102a wants to send or reallocate a particular amount of processing resources 108 (e.g., number of a first type of data object 106) to the second user 102b using the blockchain network 130. The first user 102a may access their user profile 112 by accessing the application 122a on the computing device 120a. The first user 102a may initiate a request 104 from the application 122a to transmit or reallocate the particular number of the first type of data object 106 to the second user 102b, e.g., at the second node 132b. The computing device 120a sends the request 104 to the server 140 for processing. The operation of processing the request 104 is described below in conjunction with the operational flow of the system 100.

Blockchain Network

Blockchain network 130 comprises a cloud of computer systems (or nodes 132) and is generally configured to keep records of communications and interactions among the nodes 132. The blockchain network 130 may comprise any number of nodes 132. In the illustrated embodiment, the first node 132a and the second node 132b are shown. Each node 132 may comprise a computing device, a virtual machine, and/or the like, generally referred to herein as computing device 120.

Each of the nodes 132a and 132b is an instance of a node 132. Each node 132 may comprise a processor 162 in signal communication with a memory 164 and a network interface 166. For example, the node 132a may comprise the processor 152a in signal communication with the memory 164a and network interface 166a; and the node 132b may comprise the processor 152b in signal communication with the memory 164b and network interface 166b.

Processor 162 comprises one or more processors operably coupled to the memory 164. The processor 162 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 162 may be a programmable logic device, a microcontroller, a microprocessor, or any suitable combination of the preceding. The one or more processors are configured to process data and may be implemented in hardware or software. For example, the processor 162 may be 8-bit, 16-bit, 32-bit, 64-bit, or of any other suitable architecture. The processor 162 may include an arithmetic logic unit (ALU) for performing arithmetic and logic operations. The processor 162 may register the supply operands to the ALU and stores the results of ALU operations. The processor 162 may further include a control unit that fetches instructions from memory and executes them by directing the coordinated operations of the ALU, registers and other components. The one or more processors are configured to implement various software instructions. For example, the one or more processors are configured to execute software instructions to perform one or more functions described herein. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-2.

Network interface 166 is configured to enable wired and/or wireless communications (e.g., via network 110). The network interface 166 is configured to communicate data between the node 132 and other devices (e.g., computing devices 120), servers 140, blocks 136, databases, systems, or domains. For example, the network interface 166 may comprise a WIFI interface, a local area network (LAN) interface, a wide area network (WAN) interface, a modem, a switch, or a router. The processor 162 is configured to send and receive data using the network interface 166. The network interface 166 may be configured to use any suitable type of communication protocol as would be appreciated by one of ordinary skill in the art.

Memory 164 may be volatile or non-volatile and may comprise a read-only memory (ROM), random-access memory (RAM), ternary content-addressable memory (TCAM), dynamic random-access memory (DRAM), and static random-access memory (SRAM). Memory 164 may be implemented using one or more disks, tape drives, solid-state drives, and/or the like. Memory 164 is operable to store the user interaction session metadata 134 (interchangeably used herein as metadata 134), software instructions, and/or any other data or instructions. The software instructions may comprise any suitable set of instructions, logic, rules, or code operable to execute the processor 162. The user interaction session metadata 134 may comprise data related to the user 102a (e.g., user profile 112a), data related to the user 102b (e.g., user profile 112b), the user interaction session 152 (e.g., that includes the particular amount of data processing resources 108 and/or data objects 106), a security token 114, user interaction session 152, requested data objects 138, time period 118, and/or any other data/instructions.

Each node 132 may be associated with a user profile 112. For example, the first node 132a may be associated with the first user profile 112a, and the second node 132b may be associated with the second user profile 112b.

The blockchain network 130 may further comprise blocks 136. Each block 136 may comprise a memory block or storage capacity resident in a database or data center communicatively coupled with the components of the system 100.

When the user 102a initiates the request 104 to allocate (or send) a particular number of the first type of data objects 106 to the user 102b, upon validation that the user profile 112a is associated with the particular number of the first type of data objects 106, a block 136 that represents the request 104 is created and added to the existing blocks 136.

For example, the block 136 may be created by one or more processors (e.g., processor(s) 162 operably coupled with the component of the blockchain network 130 and system 100. In another example, the block 136 may be created by a processor associated with a database server configured to create and store the block 136, and oversee operations within the blockchain network 130). The newly created block 136 may store user interaction session metadata 134 and/or any other data. One or more processors associated with the blockchain network 130 (e.g., one or more processors 162) may send one or more data items in the metadata 134 listed above to the first node 132a and the second node 132b. The one or more processors associated with the blockchain network 130 may receive a confirmation that indicates the data transmission is complete. Upon receiving the confirmation that the data transmission is complete, the one or more processors associated with the blockchain network 130 may generate a completion token 116 that indicates the data transmission is complete, and close or lock the block 136.

Server

Server 140 is generally a device that is configured to process data and communicate with computing devices (e.g., computing devices 120), databases, blockchain network 130, etc., via the network 110. The server 140 is generally configured to oversee the operations of the processing engine 144, as described further below in conjunction with the operational flow of system 100 and method 200 described in FIG. 2.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the processing engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-2. For example, the processor 142 may be configured to perform one or more steps of method 200 as described in FIG. 2.

Network interface 146 is configured to enable wired and/or wireless communications (e.g., via network 110). The network interface 146 is configured to communicate data between the server 140 and other devices (e.g., computing devices 120), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the software instructions 150, request 104, data objects 106, user interaction session 152, performance indicators 154, historical data 156, metadata 134, and/or any other data or instructions. The software instructions 150 may comprise any suitable set of instructions, logic, rules, or code operable to execute the processor 142.

Processing Engine

Processing engine 144 may be implemented by the processor 142 executing the software instructions 150, and is generally configured to implement secure transmission of data objects 106 (and/or secure allocation and/or reallocation of the processing resources 108) among nodes 132 and/or among user profiles 112.

In one embodiment, the processing engine 144 may be configured to evaluate a sending user profile 112 (e.g., the user profile 112a) to determine whether the user profile 112a is associated with a particular number of a first type of data objects 106 (e.g., particular amount of processing resources 108) that is requested to be transmitted or allocated to another user profile 112 (e.g., user profile 112b). The particular amount of processing resources 108 may interchangeably referred to herein as a particular number of a first type of data objects 106, where the first type of data objects 106 may be unallocated or available of processing resources 108a.

In one embodiment, in response to determining that the user profile 112a is associated with the particular number of the first type of data object 106 (e.g., particular amount of processing resources 108a), the processing engine 144 may transmit or allocate the particular number of data objects 106 from the user profile 112a to the user profile 122b.

In one embodiment, in response to determining that the user profile 112a is not associated with the particular number of the first type of data object 106, the processing engine 144 may identify one or more types of data objects 106 that correspond to the particular number of data objects 106, e.g., a particular amount of allocated (or already in use) processing resources 108b that has the same amount of resources as the particular amount of available (or requested) processing resources 108a.

In one embodiment, in response to determining that the user profile 112a is not associated with the particular number of the first type of data objects 106, the processing engine 144 may identify two or more types of data objects 106 that in the aggregate correspond to the particular number of data objects 106.

These operations are described in more detail in the operational flow of system 100 below.

Operational Flow

Determining Whether a Sending User Profile is Associated with the Requested Data Object The operational flow of the system 100 begins when the processing engine 144 receives a request 104, from the first user profile 112a, to transmit or allocate a particular number of the first type of data objects 106 to the second user profile 112b. In the example where the data objects 106 are reallocated or transmitted from the first user profile 112a to the second user profile 112b, the first user profile 112a may be referred to as the sender profile 112a, and the second user profile 112b may be referred to as the receiver profile 112b. For example, the first type of data objects 106 may be unallocated processing resources 108a, or text, documents, media files, etc. The processing engine 144 may receive the request 104 from the computing device 120a, similar to that described above.

In one embodiment, the processing engine 144 may evaluate the sender profile 112a to determine whether the sender profile 112a is associated with the particular number of the first type of data object 106 (e.g., processing resources 108a).

In response to determining that the user profile 112a is associated with the particular number of the first type of data object 106 (e.g., processing resources 108a), the processing engine 144 may fetch the requested data objects 106 from the user profile 112a.

In one embodiment, in response to determining that the user profile 112a is not associated with the particular number of the first type of data object 106 (e.g., processing resources 108a), the processing engine 144 may determine whether the user profile 112a is associated with one or more other types of data objects 106 (e.g., allocated (or already in use) processing resources 108b) that correspond to the particular number of requested data objects 106. In other words, the processing engine 144 may determine whether the user profile 112a is associated with one or more allocated (or already in use) processing resources 108b that correspond to the particular amount of processing resources 108a. In another embodiment, in response to determining that the user profile 112a is not associated with the particular number of the first type of data object 106, the processing engine 144 may determine whether the user profile 112a is associated with two or more other types of data objects 106 (e.g., processing resources 108b) that in the aggregate amount to the requested particular number of data objects 106.

In one embodiment, in response to determining that the user profile 112a is associated with the one or more other types of data objects 106 that correspond to the particular number of the first type of data object 106, the processing engine 144 may perform one or more functions described below. In another embodiment, in response to determining that the user profile 112a is associated with two or more types of data objects 106 (e.g., processing resources 108b) that in the aggregate amount to the particular number of the first type of data object 106 (e.g., processing resources 108a), the processing engine 144 may perform one or more functions described below.

Initiating the User Interaction Session

The processing engine 144 may initiate a user interaction session 152 between the user profiles 112a and 112b and/or between nodes 132a and 132b.

During the user interaction session 152, the processing engine 144 may transmit and/or allocate the one or more other types of data objects 106 (or the aggregated data objects 106 comprising two or more types of data objects 106, e.g., occupied processing resources 108b) that correspond to the particular number of the first type of data object 106, e.g., unallocated processing resources 108a from the user profile 112a to the user profile 112b.

The processing engine 144 and/or a processor associated with the blockchain network 130 (e.g., processor(s) 162) may generate a block 136 that indicates the request 104 is received and/or the user interaction session 152 is initiated, similar to that described above. The newly created block 136 may store the metadata 134. The processor associated with the blockchain network 130 (e.g., processor(s) 162) may send the metadata 134 to the first node 132a and the second node 132b.

The user profile 112a may include one or more of name, address, phone number, account information associated with the user 102a, and data associated with the user profile 112a. The user profile 112b may include one or more of name, address, phone number, account information associated with the user 102b, and data associated with the user profile 112b. The requested data objects 138 may include the requested number of the first type of data objects 106, the aggregated two or more types of the data objects 106 (that correspond to the requested number of the first type of data objects 106), or the one or more other types of data objects 106 (that correspond to the requested number of the first type of data objects 106).

The security token 114 may include a hash key that is generated by the processing engine 144 and/or a processor associated with the blockchain network 130 (e.g., processor(s) 162). For example, upon generating the block 136, the processing engine 144 and/or a processor associated with the blockchain network 130 (e.g., processor(s) 162) may generate the security token 114. The security token 114 may comprise a series of numbers, letters, and/or symbols. The security token 114 is used to uniquely identify the newly generated block 136 and/or validate the user interaction session 152.

The processing engine 144 may retrieve the requested data objects 138 from the user profile 112*a*.

Transmitting the Requested Data Objects to the Receiving User Profile

The processing engine 144 may transmit or allocate the one or more other types of data objects 106 (e.g., occupied processing resources 108*b*) that correspond to the requested number of data objects 106 (e.g., unallocated processing resources 108*a*) or the aggregated two or more types of data objects 106 (e.g., occupied processing resources 108*b*) that in the aggregate correspond to the requested number of data objects 106 (e.g., unallocated processing resources 108*a*) from the sending user profile 112*a* to the receiving user profile 112*b*.

The processing engine 144 may store, in the block 136, an indication that the one or more other types of data objects 106 that correspond to the requested number of data objects 106 or the aggregated two or more types of data objects 106 (that in the aggregate correspond to the requested number of data objects 106) are transmitted from the user profile 112*a* to the user profile 112*b*.

The processing engine 144 may store, in the block 136, a completion token 116 that indicates the user interaction session 152 is completed, the data transmission or the processing resource allocation/reallocation is completed. The processing engine 144 may send the completion token 116 to the nodes 132*a*, 132*b*, and other nodes 132.

The processing engine 144 may distribute the metadata 134 among a plurality of nodes 132 within the blockchain network 130 such that any data stored in the metadata 134 is verifiable at any node 132.

In one embodiment, the processing engine 144 may determine whether the one or more other types of data objects 106 that correspond to the requested number of data objects 106 or the aggregated two or more types of data objects 106 (that in the aggregate correspond to the requested number of data objects 106) are available to be allocated, reallocated, or transmitted to the receiver profile 112*b* at a particular timestamp, e.g., when the user interaction session 152 is initiated.

In some cases, the one or more other types of data objects 106 that correspond to the requested number of data objects 106 or the aggregated two or more types of data objects 106 (that in the aggregate correspond to the requested number of data objects 106) may not be readily available at the user profile 112*a* when the user interaction session 152 is initiated. For example, retrieval of this information may be possible after a particular time period 118, and this information may be available after the particular time period 118, e.g., one hour, two days, etc. For example, the one or more other types of data objects 106 (or the processing resources 108*b*) may already be allocated to a software/hardware module.

In such cases, to facilitate the allocation/reallocation of processing resources 108*b* or transmission of the requested data objects 106 at the particular timestamp, the processing engine 144 may perform one or more functions described below.

In response to determining that the one or more other types of data objects 106 that correspond to the requested number of data objects 106 or the aggregated two or more types of data objects 106 (that in the aggregate correspond to the requested number of data objects 106) are not available to be allocated and/or transmitted to the receiver profile 112*b* at the particular timestamp, the processing engine 144 fetches a number of second data objects that are equivalent to the particular number of the first type of data object 106 from an organization that is associated with the user profile 112*a*. The processing engine 144 may and/or allocate transmit the number of second data objects 106 to the receiver profile 112*b*.

In one embodiment, the process of determining whether the user profile 112*a* is associated with the one or more other types of data objects 106 that correspond to the requested number of data objects 106 or the aggregated two or more types of data objects 106 (that in the aggregate correspond to the requested number of data objects 106) is described below.

The processing engine 144 may determine a plurality of performance indicators 154 that indicate the performance of a plurality of data objects 106 associated with the user profile 112*a*. Each performance indicator 154 is associated with a particular data object 106.

The processing engine 144 may determine the performance indicators 154 based on historical data 156 associated with the data objects 106. In this process, the processing engine 144 may implement a machine learning algorithm, such as support vector machine, neural network, random forest, k-means clustering, linear regression, non-linear regression, etc., to analyze the historical data 156. The historical data 156 may be in form of text, documents, charts, etc. Thus, the processing engine 144 may implement a natural language processing program to analyze the historical data 156 and determine or predict a trend of the performance levels of the data objects 106 from the historical data 156.

The performance indicator 154 associated with a data object 106 may represent a performance level of the data object 106. For example, assume that the data object 106 is a source code that is configured to perform a specific function. The performance indicator 154 may vary based on the performance level of the data object 106. For example, if the data object 106 (e.g., processing resource 108) performs instructions as expected from the processing resources 108 (e.g., performs instructions as expected more than a threshold percentage of attempts (e.g., more than 70%, 80%, etc.), the performance indicator 154 of the data object 106 is determined to be high (e.g., 8 out of 10). Otherwise, the performance indicator 154 of the data object 106 is determined to be low (e.g., 3 out of 10).

The processing engine 144 may rank the plurality of data objects 106 based on the determined performance indicators 154. In one example, the processing engine 144 may identify one or more data objects 106 that are associated with the least performance indicators 154 less than a threshold performance indicator (e.g., less than 30%, 25%, etc.), and that corresponds to the particular number of the first type of data objects 106.

In another example, the processing engine 144 may identify two or more data objects 106 that are associated with the least performance indicators 154 less than the threshold performance indicator, and that in the aggregate correspond to the particular number of the first type of data objects 106. In another example, the processing engine 144 may identify one or more data objects 106 that are associated with the most performance indicators 154 more than the threshold performance indicator, and that corresponds to the particular number of the first type of data objects 106. In another example, the processing engine 144 may identify two or more data objects 106 that are associated with the most performance indicators 154 more than the threshold performance indicator, and that in the aggregate correspond to the particular number of the first type of data objects 106.

The processing engine 144 may use the identified data objects 106 in any of the examples above to transmit to the user profile 112b.

Validating the User Interaction Session and the Data Transmission

In one embodiment, the processing engine 144 may be configured to validate the user interaction session 152, as described below. For example, in response to determining that the user profile 112a is associated with the one or more other types of data objects 106 that correspond to the requested number of data objects 106 or the aggregated two or more types of data objects 106 (that in the aggregate correspond to the requested number of data objects 106), the processing engine 144 generates the security token 114 to validate the user interaction session 152, similar to that described above.

The processing engine 144 may send a first copy of the security token 114 to the node 132a. The processing engine 144 may send a second copy of the security token 114 to the node 132b. Once the one or more other types of data objects 106 that correspond to the requested number of data objects 106 or the aggregated two or more types of data objects 106 (that in the aggregate correspond to the requested number of data objects 106) are transmitted to the user profile 112b, the processing engine 144 determines whether the user interaction session 152 is valid.

To this end, the processing engine 144 determines whether the first copy of the security token 114 matches the second copy of the security token 114. For example, the processing engine 144 may implement text analysis, hash function, and/or any data processing algorithm to compare the first copy of the security token 114 with the second copy of the security token 114.

In response to determining that the first copy of the security token 114 matches the second copy of the security token 114, the processing engine 144 determines that the user interaction session 152 is valid.

In one embodiment, the processing engine 144 may store another copy of the security token 114 in an external database. Thus, the processing engine 144 may compare the other copy of the security token 114 with one or more copies stored in one or both nodes 132a and 132b to determine whether they match.

In response to validating the security token 114 and determining that the user interaction session 152 is valid, the processing engine 144 may transmit the one or more other types of data objects 106 that correspond to the requested number of data objects 106 or the aggregated two or more types of data objects 106 (that in the aggregate correspond to the requested number of data objects 106) to the user profile 112b.

In one embodiment, this transmission may be via one or more nodes 132. In one embodiment, this transmission may be via one or more external organizations. For example, the one or more other types of data objects 106 that correspond to the requested number of data objects 106 or the aggregated two or more types of data objects 106 (that in the aggregate correspond to the requested number of data objects 106) may be retrieved from a first organization associated with the user profile 112a, and transmitted to a second organization associated with the user profile 112b.

Once the one or more other types of data objects 106 that correspond to the requested number of data objects 106 or the aggregated two or more types of data objects 106 (that in the aggregate correspond to the requested number of data objects 106) are allocated and/or transmitted to the user profile 112b, the processing engine 144 may generate the completion token 116 that indicates the allocation and/or transmission is complete. The processing engine 144 may store the completion token 116 in the metadata 134.

In response to determining that the allocation and/or transmission is complete, the processing engine 144 may send an alert message to the computing devices 120a and/or 120b that indicates the transmission is complete.

Figure 2:
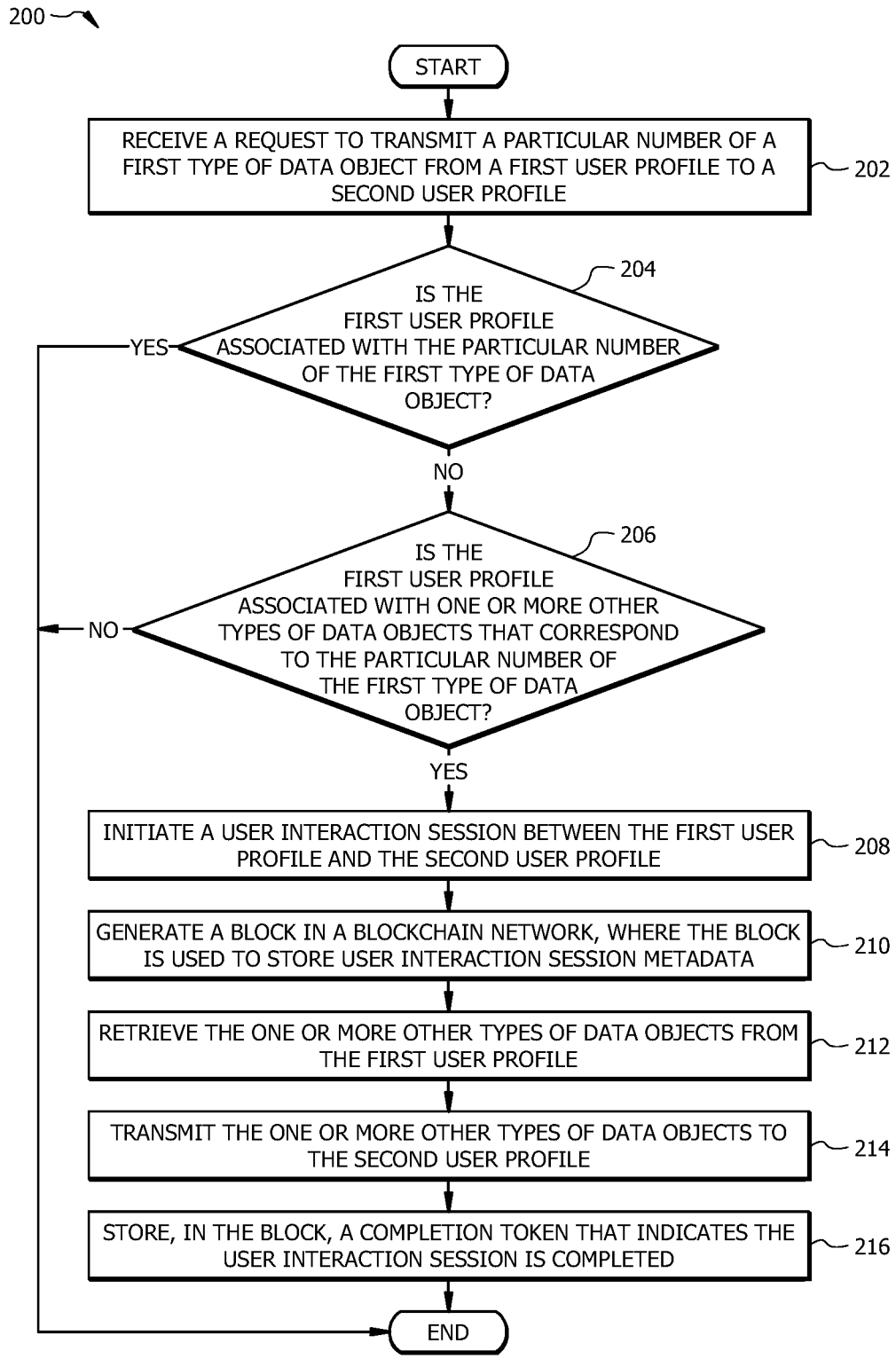
FIG. 2 illustrates an example flowchart of a method for implementing secure data object transmission among user profiles using a blockchain network.

Example Method for Implementing Secure Data Object Transmission Among User Profiles Using the Blockchain Network FIG. 2 illustrates an example flowchart of a method 200 for implementing secure transmitting of data objects 106 among user profiles 112 using blockchain network 130. Modifications, additions, or omissions may be made to method 200. Method 200 may include more, fewer, or other steps. For example, steps may be performed in parallel or in any suitable order. While at times discussed as the system 100, processor 142, processing engine 144, one or more processors 162 associated with the blockchain network 130, or components of any of thereof performing steps, any suitable system or components of the system may perform one or more steps of the method 200. For example, one or more steps of method 200 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 202-216.

Method 200 begins at step 202 where the processing engine 144 receives a request 104 to transmit a particular number of a first type of data objects 106 from the first user profile 112a to the second user profile 112b. The first type of data objects 106 may be unallocated processing resources 108a.

At step 204, the processing engine 144 determines whether the first user profile 112a is associated with the particular number of the first type of data objects 106, similar to that described in FIG. 1. If the processing engine 144 determines that the user profile 112a is associated with the particular number of the first type of data objects 106, method 300 may terminate. Otherwise, method 200 proceeds to step 206. In one embodiment, if the processing engine 144 determines that the user profile 112a is associated with the particular number of the first type of data objects 106, the processing engine 144 may transmit the particular number of the first type of data objects 106 to the second user profile 112b, similar to that described in FIG. 1.

At step 206, the processing engine 144 determines whether the first user profile 112a is associated with one or more other types of data objects 106 that correspond to the particular number of the first type of data objects 106, similar to that described in FIG. 1. The other type of data objects 106 may be occupied processing resources 108b. If the processing engine 144 determines that the first user profile 112a is associated with one or more other types of data objects 106 that correspond to the particular number of the first type of data objects 106, method 200 proceeds to step 208. Otherwise, method 200 terminates.

At step 208, the processing engine 144 initiates the user interaction session 152 between the first user profile 112a and the second user profile 112b. In this process, the processing engine 144 may store the user interaction session 152 in the memory 148.

At step 210, the processing engine 144 generates a block 136 in the blockchain network 130, where the block 136 is used to store the user interaction session 152. The processing engine 144 may generate the block 136 in a database by allocating a particular memory block or storage capacity in the database to the block 136.

At step 212, the processing engine 144 retrieves the one or more other types of data objects 106 from the first user profile 112a. For example, the processing engine 144 may access the user profile 112a and retrieve the one or more other types of data objects 106, similar to that described in FIG. 1.

At step 214, the processing engine 144 transmits the one or more other types of data objects 106 to the second user profile 112b. In this process, the processing engine 144 may transmit the one or more other types of data objects 106 via one or more nodes 132 and/or external entities, such as organizations associated with the user profiles 112a and 112b.

At step 216, the processing engine 144 stores, in the block 136, a completion token 116 that indicates the user interaction session 152 is completed.

In some embodiments, method 200 may include one or more additional steps performed by the processing engine 144 and/or a processor 162 described in FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for transmitting data objects among user profiles using a blockchain comprising:
a blockchain network comprising a sender node and a receiver node, wherein:
the sender node is associated with a sender profile; and
the receiver node is associated with a receiver profile; and
a processor, communicatively coupled with the blockchain network, and configured to:
receive a request to transmit a particular number of a first type of data object to the receiver profile;
evaluate the sender profile to determine whether the sender profile is associated with the particular number of the first type of data object;
in response to determining that the sender profile is not associated with the particular number of the first type of data object, determine whether the sender profile is associated with one or more other types of data objects that correspond to the particular number of the first type of data object;
in response to determining that the sender profile is associated with the one or more other types of data objects that correspond to the particular number of the first type of data object:
initiate a user interaction session between the sender profile and the receiver profile, wherein during the user interaction session the one or more other types of data objects are transmitted from the sender profile to the receiver profile;
generate a block in the blockchain network, wherein:
the block is used to store user interaction session metadata comprising one or more of the sender profile, the receiver profile, and the requested data object; and
the block comprises a storage capacity;
retrieve the one or more other types of data objects from the sender profile;
transmit the one or more other types of data objects from the sender profile to the receiver profile;
store, in the block, an indication that the one or more other types of data objects are transmitted from the sender profile to the receiver profile; and
store, in the block, a completion token that indicates the user interaction session is completed.

2. The system of claim 1, wherein the processor is further configured to distribute the user interaction session between a plurality of nodes within the blockchain network such that the user interaction session is verifiable at any node from among the plurality of nodes.

3. The system of claim 1, wherein the processor is further configured to, in response to determining that the sender profile is not associated with the particular number of the first type of data object, determine whether the sender profile is associated with two or more types of data objects that in the aggregate amount to the particular number of the first type of data object.

4. The system of claim 1, wherein:
the sender profile is associated with a first organization; and
the processor is further configured to:
determine whether the one or more other types of data objects are available to be transmitted to the receiver profile at a particular timestamp;

in response to determining that the one or more other types of data objects are not available to be transmitted to the receiver profile at the particular timestamp:
  fetch a number of second data objects equivalent to the particular number of the first type of data object from the first organization; and
  transmit the number of second data objects to the receiver profile.

5. The system of claim 1, wherein determining whether the sender profile is associated with the one or more other types of data objects that correspond to the particular number of the first type of data object comprises:
  determining a plurality of performance indicators that indicate the performance of a plurality of data objects associated with the sender profile based at least in part upon historical data of the plurality of data objects, such that in response to determining that the historical data indicates that a value associated with a particular data object has become less than a threshold value, a low performance indicator is assigned to the particular data object, wherein each data object from among the plurality of data objects is associated with a different performance indicator from among the plurality of performance indicators;
  ranking the plurality of data objects based at least in part upon the plurality of performance indicators; and
  identifying one or more data objects that are associated with the least performance indicators less than a threshold performance indicator, and that correspond to the particular number of the first type of data object.

6. The system of claim 1, wherein the processor is further configured to:
  in response to determining that the sender profile is associated with the one or more other types of data objects that correspond to the particular number of the first type of data object:
    generate a security token that is used to validate the user interaction session;
    send a first copy of the security token in the sender node;
    send a second copy of the security token in the receiver node; and
  in response to transmitting the one or more other types of data objects from the sender profile to the receiver profile, determine whether the user interaction session is valid by determining whether the first copy of the security token matches the second copy of the security token.

7. The system of claim 1, wherein each of the sender node and the receiver node comprises a computing device or a virtual machine.

8. A method for transmitting data objects among user profiles using a blockchain comprising:
  receiving a request to transmit a particular number of a first type of data object to a receiver profile;
  evaluating a sender profile to determine whether the sender profile is associated with the particular number of the first type of data object;
  in response to determining that the sender profile is not associated with the particular number of the first type of data object, determining whether the sender profile is associated with one or more other types of data objects that correspond to the particular number of the first type of data object;
  in response to determining that the sender profile is associated with the one or more other types of data objects that correspond to the particular number of the first type of data object:
    initiating a user interaction session between the sender profile and the receiver profile, wherein during the user interaction session the one or more other types of data objects are transmitted from the sender profile to the receiver profile;
    generating a block in a blockchain network, wherein:
      the blockchain network comprises a sender node and a receiver node;
      the sender node is associated with the sender profile;
      the receiver node is associated with the receiver profile;
      the block is used to store user interaction session metadata comprising one or more of the sender profile, the receiver profile, and the requested data object; and
      the block comprises a storage capacity;
    retrieving the one or more other types of data objects from the sender profile;
    transmitting the one or more other types of data objects from the sender profile to the receiver profile;
    storing, in the block, an indication that the one or more other types of data objects are transmitted from the sender profile to the receiver profile; and
    storing, in the block, a completion token that indicates the user interaction session is completed.

9. The method of claim 8, further comprising distributing the user interaction session between a plurality of nodes within the blockchain network such that the user interaction session is verifiable at any node from among the plurality of nodes.

10. The method of claim 8, further comprising, in response to determining that the sender profile is not associated with the particular number of the first type of data object, determining whether the sender profile is associated with two or more types of data objects that in the aggregate amount to the particular number of the first type of data object.

11. The method of claim 8, further comprising:
  determining whether the one or more other types of data objects are available to be transmitted to the receiver profile at a particular timestamp;
  in response to determining that the one or more other types of data objects are not available to be transmitted to the receiver profile at the particular timestamp:
    fetching a number of second data objects equivalent to the particular number of the first type of data object from a first organization, wherein the first organization is associated with the sender profile; and
    transmitting the number of second data objects to the receiver profile.

12. The method of claim 8, wherein determining whether the sender profile is associated with the one or more other types of data objects that correspond to the particular number of the first type of data object comprises:
  determining a plurality of performance indicators that indicate the performance of a plurality of data objects associated with the sender profile based at least in part upon historical data of the plurality of data objects, such that in response to determining that the historical data indicates that a value associated with a particular data object has become less than a threshold value, a low performance indicator is assigned to the particular data object, wherein each data object from among the plurality of data objects is associated with a different performance indicator from among the plurality of performance indicators;
ranking the plurality of data objects based at least in part upon the plurality of performance indicators; and
identifying one or more data objects that are associated with the least performance indicators less than a threshold performance indicator, and that correspond to the particular number of the first type of data object.

13. The method of claim 8, further comprising:
in response to determining that the sender profile is associated with the one or more other types of data objects that correspond to the particular number of the first type of data object:
generating a security token that is used to validate the user interaction session;
sending a first copy of the security token in the sender node;
sending a second copy of the security token in the receiver node; and
in response to transmitting the one or more other types of data objects from the sender profile to the receiver profile, determine whether the user interaction session is valid by determining whether the first copy of the security token matches the second copy of the security token.

14. The method of claim 8, wherein each of the sender node and the receiver node comprises a computing device or a virtual machine.

15. A computer program comprising executable instructions stored in a non-transitory computer-readable medium that when executed by a processor causes the processor to:
receive a request to transmit a particular number of a first type of data object to a receiver profile;
evaluate a sender profile to determine whether the sender profile is associated with the particular number of the first type of data object;
in response to determining that the sender profile is not associated with the particular number of the first type of data object, determine whether the sender profile is associated with one or more other types of data objects that correspond to the particular number of the first type of data object;
in response to determining that the sender profile is associated with the one or more other types of data objects that correspond to the particular number of the first type of data object:
initiate a user interaction session between the sender profile and the receiver profile, wherein during the user interaction session the one or more other types of data objects are transmitted from the sender profile to the receiver profile;
generate a block in a blockchain network, wherein:
the blockchain network comprises a sender node and a receiver node;
the sender node is associated with the sender profile;
the receiver node is associated with the receiver profile;
the block is used to store user interaction session metadata comprising one or more of the sender profile, the receiver profile, and the requested data object; and
the block comprises a storage capacity;
retrieve the one or more other types of data objects from the sender profile;
transmit the one or more other types of data objects from the sender profile to the receiver profile;
store, in the block, an indication that the one or more other types of data objects are transmitted from the sender profile to the receiver profile; and
store, in the block, a completion token that indicates the user interaction session is completed.

16. The computer program of claim 15, wherein the instructions when executed by the processor further cause the processor to distribute the user interaction session between a plurality of nodes within the blockchain network such that the user interaction session is verifiable at any node from among the plurality of nodes.

17. The computer program of claim 15, wherein the instructions when executed by the processor, further cause the processor to, in response to determining that the sender profile is not associated with the particular number of the first type of data object, determine whether the sender profile is associated with two or more types of data objects that in the aggregate amount to the particular number of the first type of data object.

18. The computer program of claim 15, wherein the instructions when executed by the processor, further cause the processor to:
determine whether the one or more other types of data objects are available to be transmitted to the receiver profile at a particular timestamp;
in response to determining that the one or more other types of data objects are not available to be transmitted to the receiver profile at the particular timestamp:
fetch a number of second data objects equivalent to the particular number of the first type of data object from a first organization, wherein the first organization is associated with the sender profile; and
transmit the number of second data objects to the receiver profile.

19. The computer program of claim 15, wherein determining whether the sender profile is associated with the one or more other types of data objects that correspond to the particular number of the first type of data object comprises:
determining a plurality of performance indicators that indicate the performance of a plurality of data objects associated with the sender profile based at least in part upon historical data of the plurality of data objects, such that in response to determining that the historical data indicates that a value associated with a particular data object has become less than a threshold value, a low performance indicator is assigned to the particular data object, wherein each data object from among the plurality of data objects is associated with a different performance indicator from among the plurality of performance indicators;
ranking the plurality of data objects based at least in part upon the plurality of performance indicators; and
identifying one or more data objects that are associated with the least performance indicators less than a threshold performance indicator, and that correspond to the particular number of the first type of data object.

20. The computer program of claim 15, wherein the instructions when executed by the processor, further cause the processor to:
in response to determining that the sender profile is associated with the one or more other types of data objects that correspond to the particular number of the first type of data object:
generate a security token that is used to validate the user interaction session;
send a first copy of the security token in the sender node;

send a second copy of the security token in the receiver node; and in response to transmitting the one or more other types of data objects from the sender profile to the receiver profile, determine whether the user interaction session is valid by determining whether the first copy of the security token matches the second copy of the security token.

\* \* \* \* \*